United States Patent [19]

Williams

[11] Patent Number: 5,251,314

[45] Date of Patent: Oct. 5, 1993

[54] SYSTEM FOR CONVERTING FROM ONE DOCUMENT TYPE TO A PLURALITY OF DOCUMENT TYPES ALLOWING ACCURATE REVERSAL THEREFROM USING TABLES CONTAINING INDICATIONS REGARDING NON-TRANSFORMABLE ELEMENTS

[75] Inventor: Marvin L. Williams, Lewisville, Tex.

[73] Assignee: International Business Machines Corporation, Armonk, N.Y.

[21] Appl. No.: 534,825

[22] Filed: Jun. 7, 1990

[51] Int. Cl.$^5$ .................. G06F 15/38; G06F 15/40
[52] U.S. Cl. ........................ 395/600; 364/DIG. 2; 364/963; 364/963.3; 364/419.1; 395/500
[58] Field of Search .................. 395/500, 600; 364/419

[56] References Cited

U.S. PATENT DOCUMENTS

| | | | |
|---|---|---|---|
| 4,727,480 | 2/1988 | Albright et al. | 364/200 |
| 4,951,196 | 8/1990 | Jackson | 364/401 |
| 5,021,995 | 6/1991 | Quint et al. | 395/600 |
| 5,202,977 | 4/1993 | Pasetes, Jr. et al. | 395/500 |

Primary Examiner—Thomas C. Lee
Assistant Examiner—Peter Y. Wang
Attorney, Agent, or Firm—Andrew J. Dillon

[57] ABSTRACT

A method and system is disclosed for efficiently managing the transformation of a document from a first document type to a second document type within a data processing system. It is often necessary for a document within a data processing system to be transformed into a second document type which is recognizable by a second entity upon a transfer of that document. In accordance with the method and system of the present invention, a transform information object is created for each object within a data processing system. An indication of each document type which has been created as a result of a transformation of that document and an identification of the application which can perform the transformation are then stored within the transform information object along with an indication of selected entities within the document which were not transformable by the application. Subsequent attempts at a transformation of the document may then be efficiently performed by a reference to the transform information object and the utilization of the information stored therein. In one embodiment of the present invention the transform application name, address location within the data processing system and capability description are stored within the transform information object.

6 Claims, 3 Drawing Sheets

SYSTEM FOR CONVERTING FROM ONE DOCUMENT TYPE TO A PLURALITY OF DOCUMENT TYPES ALLOWING ACCURATE REVERSAL THEREFROM USING TABLES CONTAINING INDICATIONS REGARDING NON-TRANSFORMABLE ELEMENTS

BACKGROUND OF THE INVENTION

1. Technical Field

The present invention relates in general to a method and system of improving a data processing system and in particular to a method and system for efficiently managing the transformation of document types within a data processing system. Still more particularly, the present invention relates to a method and system for permitting the efficient transformation of a document from a first document type to a second document type by means of a reference to a stored indication of previous transformations.

2. Description of the Related Art

In the modern electronic office environment there exist many scenarios in which a data object or document needs to be transformed from one type of data object to a second type of data object in order to be comprehensible to a selected user. Such situations often occur when a document is being distributed from one enterprise to a second enterprise within a distributed data processing system. In such situations the need may exist to transform the document from a first document type to a second document type which is recognizable by the receiving enterprise. As is often the case during such transformations, selected information such as characters, graphics or images cannot be accurately represented within the transformed document. In such cases this information is generally lost.

In transformations of the type described herein, the object type which must be transformed is generally referred to as the "source" object and the resultant document type which exists after a transformation is referred to as the "target" object.

Those skilled in the art will appreciate that many such transformation applications exist which are capable of transforming a document from one type to another. For example, numerous software applications are currently marketed which are capable of transforming a document which has been stored in a format associated with a particular word processing application to a format which is accessible and comprehensible to a second type of word processing application.

One existing method of identifying that a document has been transformed is the method which is utilized in conjunction with the Document Interchange Architecture (DIA) of International Business Machines Corporation. When the document type in the Base Subprofile for a particular document differs from the document type listed within the Document Unit Introducer, for that document, a user may assume that a document transform has occurred.

Unfortunately, this method assumes that the Document Unit Introducer will always be present with the document itself. Furthermore, this method only identifies the fact that a transformation of the document has occurred. There is no method utilizing this technique whereby the existence of intermediate transformations of that document may be identified.

Therefore, it should be obvious that a method is needed which may be utilized to identify a sequence of multiple transformations which have occurred with regard to a document so that an entire series of transformations may be reversed or partially reversed to restore a document to any intermediate document type or the original document type.

SUMMARY OF THE INVENTION

It is therefore one object of the present invention to provide a method and system of improving a data processing system.

It is another object of the present invention to provide a method and system for efficiently managing the transformation of a document type within a data processing system.

It is yet another object of the present invention to provide a method and system for permitting the efficient transformation of a document from a first document type to a second document type by means of a reference to a stored indication of previous transformations of that document.

The foregoing objects are achieved as is now described. In accordance with the method and system of the present invention, a transform information object is created for each object within a data processing system. An indication of each document type which may be created as a result of a transformation of that document and an identification of the application which can perform that transformation are then stored within the transform information object. Subsequent attempts at a transformation of the document may then be efficiently performed by a reference to the transform information object and the utilization of the information stored therein. In one embodiment of the present invention the transform application name, address location within the data processing network and capability description are stored within the transform information object.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
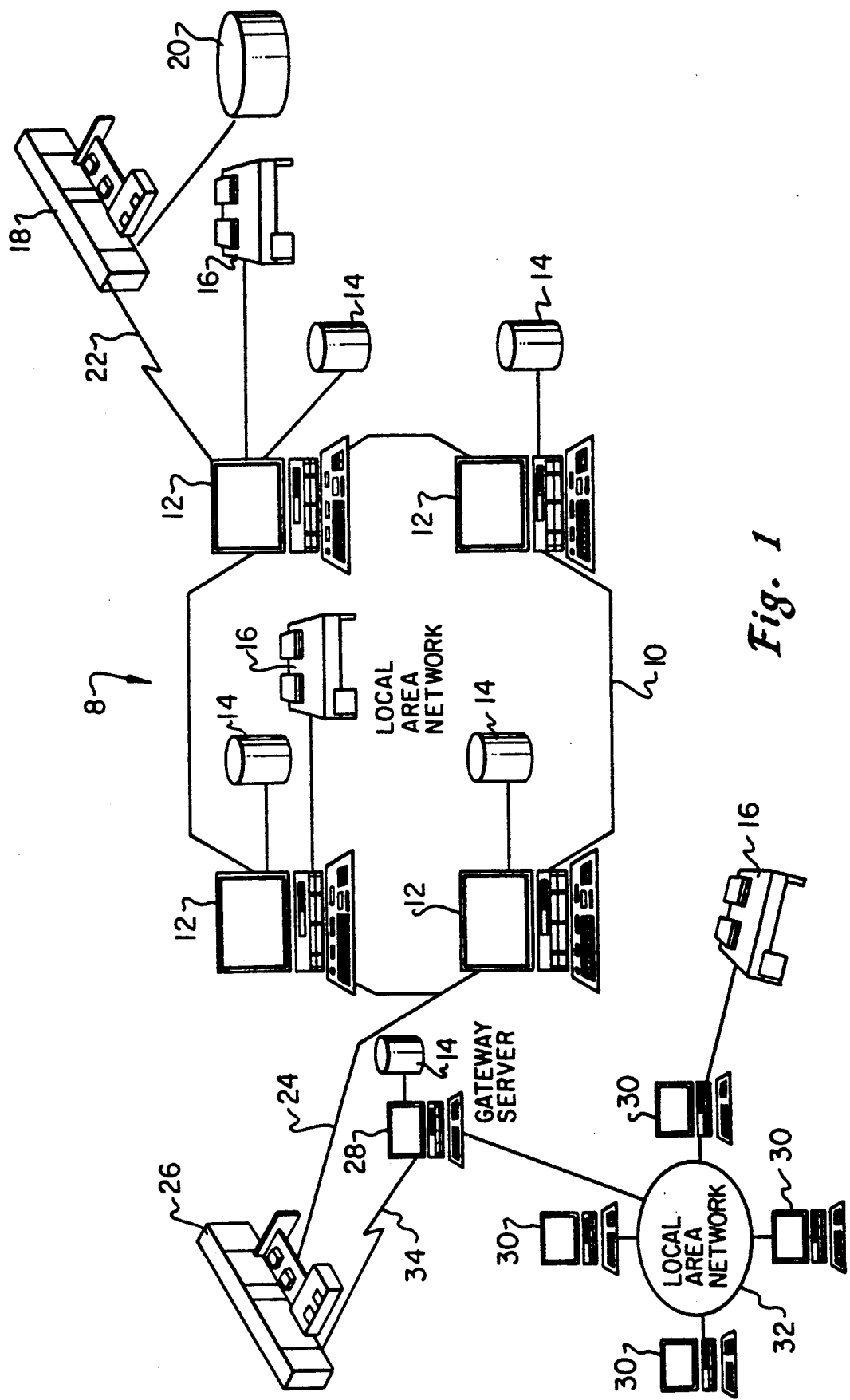
FIG. 1 is a pictorial representation of a distributed data processing system which may be utilized to implement the method and system of the present invention.

With reference now to the figures and in particular with reference to FIG. 1 there is depicted a pictorial representation of a data processing system s which may be utilized to implement the method and system of the present invention. As may be seen, data processing system 8 may include a plurality of networks, such as Local Area Networks (LAN) 10 and 32, each of Which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within data processing system 8, in accordance with the method of the present invention. In a manner well known in the prior art, each such data object or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, Which may be preferably coupled to Local Area Network (LAN) 10 by means of communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects or documents may be stored within storage device 20 and controlled by mainframe computer 18, as Resource Manager or Library Service for the data objects and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located Within Texas and mainframe computer 18 may be located in New York.

As will be appreciated upon reference to the foregoing, it is often desirable for users within one portion of distributed data processing network 8 to access a data object or document stored in another portion of data processing network 8 and subsequently transfer that data object or document to another user. As discussed above, it is often necessary to transform such a data object or document from one document type to a second document type in order to permit that document to be utilized by a second or subsequent user.

As those skilled in the art will appreciate, the transformation of a data object or document from one document type to a second document type may often result in a loss of data from within the document in those cases where an archive copy of the document has not been retained. Similarly, there exists no efficient manner in which a document may be transformed to a different document type in cases in which the current library service does not possess a transformation application capable of such transformation.

It should therefore be apparent that a need exists for a method whereby a document may be efficiently transformed from a first document type to a second document type by means of a reference to any transformation application procedure which is available within the data processing network. Further, a method is required which permits the recovery and retention of those elements within a data object or document which will not undergo accurate transformation from one document type to a second document type so that those elements may be subsequently recovered.

Figure 2:
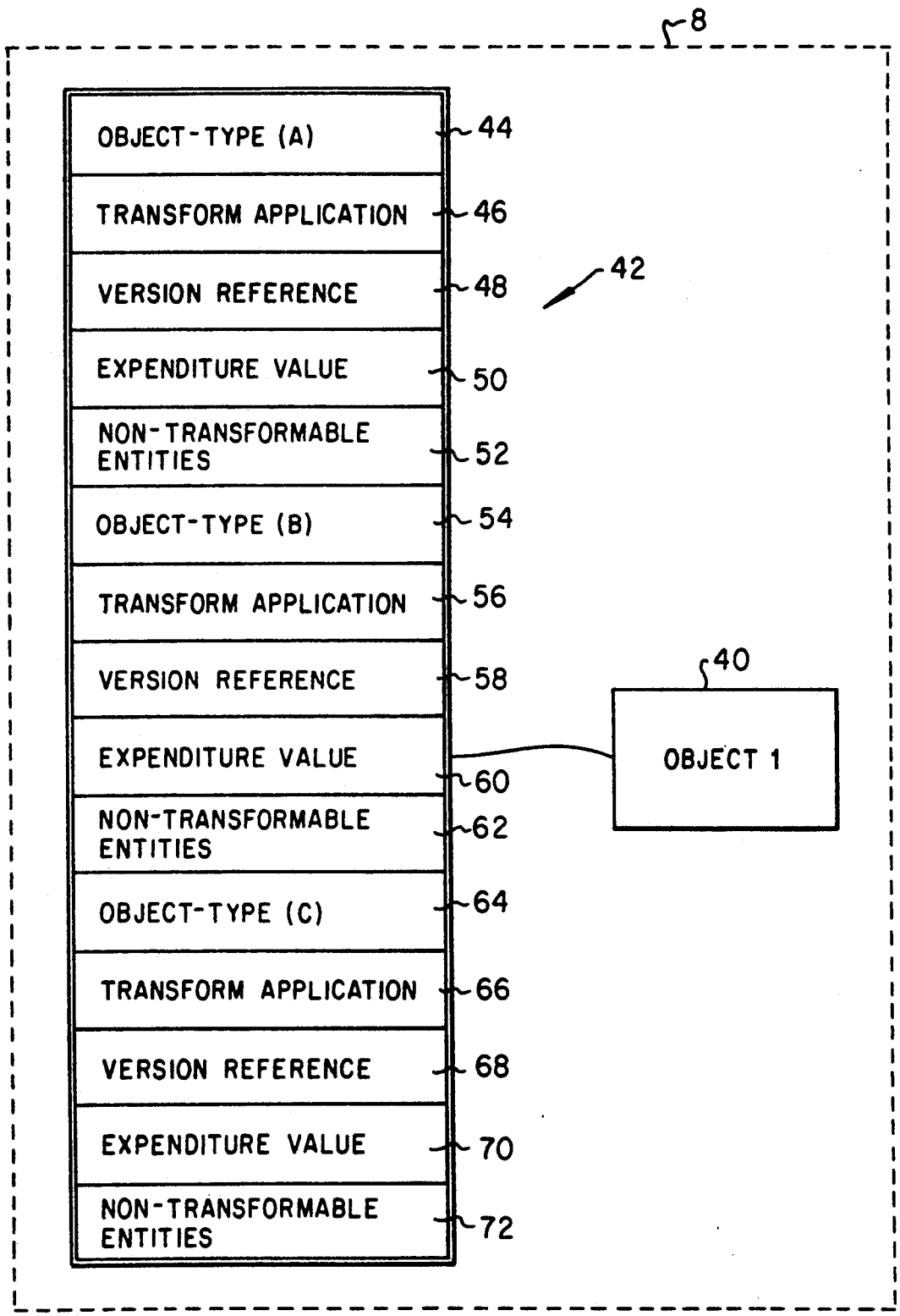
FIG. 2 is a pictorial representation of a transform information object created in accordance with the method and system of the present invention.

Referring now to FIG. 2, there is depicted a pictorial representation of a transform information object 42 which has been created within data processing network 8 (see FIG. 1) in accordance with the method and system of the present invention. As is illustrated, a data object or document 40 is illustrated within data processing network 8. Within this description of the terms "document" or "data object" are intended to mean any collection of data which may be manipulated as a single entity within data processing network 8. Associated with data object 40 within data processing network 8 is transform information object 42.

As is illustrated, transform information object 42 includes a plurality of fields of information, some or all of which may be repetitively listed for different transformations which have taken place with regard to data object 40, or as listings of the capabilities of selected transform applications which are available within data processing network 8.

In the depicted embodiment of the present invention transform information object 42 is read in reverse chronological order. That is, a source data object of type C was initially utilized to create a data object of type B. Thereafter, a final target data object type A was created utilizing data object type B as the source data object. Data object type A is the current form of data object 40.

Thus, for each segment of transform information object 42 an object type field 44, 54 or 64 is listed which identifies the various object types from which or to which data object 40 may be transformed. As those skilled in the art will appreciate, each data object type may represent a different format for a different word processing application, a different character set or an embodiment of data object 40 listed in a different language.

Also included within each section of transform information object 42 is an application identification field 46, 56, and 66. This field represents an identification of the transform application which was utilized to create the object type listed therein and which may also be utilized to restore the object type listed therein to its original source format.

In a preferred embodiment of the present invention, transform application field 46, 56 or 66 may be utilized to store an indication of the transform application name, the transform application address within data processing system s and a description of the transform application capability. This transform application capability field may be utilized to identify all transforms which this transform application is capable of accomplishing. In one embodiment of the present invention a transform application may be listed within transform information object 42 even if it has not been utilized. This may be done to create an attached index of transform application capabilities which may be utilized in conjunction with data object 40.

In this manner, when a receiving user within data processing network s receives data object 40 along with its associated transform information object 42 the user may utilize the references to the transform applications stored therein to transform data object 40 into an object type which is comprehensible within that user's environment.

Also included within each section of transform information object 42 is a version reference field 48, 58 and 68. In the depicted embodiment of the present invention, this version reference field contains information which specifically identifies the exact type of transform. This is necessary due to the fact that there typically are several different transform application procedures which may be utilized to transform a document from a first document type to a second document type. By the provision of a version reference field, transform information object 42 of the present invention permits a user to identify which version of a transform application was utilized for the transformation of the current object.

Another important feature of transform information object 42 of the present invention is illustrated in expenditure value fields 50, 60 and 70. The expenditure value field may be utilized to contain the associated costs which are incurred in the transformation of the data object back into its original source object. This cost may be a monetary value, a percentage of the information within the data object which would likely be lost, the time required to perform such a transformation, or, any other associated expenditure or combination of associated expenditures which may be associated with the designated transformation.

Finally, non-transformable entities field 52, 62 and 72 is associated with each section of transform information object 42. This field is utilized, in the depicted embodiment of the present invention, to identify those entities or sub-objects which could not be adequately transformed. That is, that information which was lost during the transformation of data object 40 from one data object type to a second data object type.

As those skilled in the art will appreciate, the amount of information which could not be accurately transformed from one document to a second document type could potentially become massive in terms of the storage requirements needed to record this information. Thus, it is intended that the information stored within each non-transformable entities field 52, 62, or 72 may comprise a reference to a central storage location wherein that information resides. In this manner, the potentially large amount of non-transformable data may be centrally stored to prevent the concomitant burden to the system which arises as a result of transmitting transform information object 42 in conjunction with data object 40 from one user to a second user.

As will be recognized upon reference to the present application, the creation of a transform information object 42 and the association of this transform information object with a data object permits the full automation of a distribution system which may be utilized to route a data object within data processing network 8 while automatically performing those transform applications which are necessary to create a data object which is comprehensible to each user receiving that data object. By automatically storing an identification of the various data object types as well as the transform applications which were utilized to create those types, subsequent transformations of a data object within the data processing network may be accomplished by a reference to transform information object 42.

In accordance with the method of the present invention, data object 40 may be channeled through various library services within data processing network 8 in route to a subsequent user of that data object. In accordance with the depicted embodiment of the present invention each library service or user which acts as a conduit for data object 40 may, if so desired, enter those transformation application capabilities resident within that library service or user into transform information object 42 without actually transforming data object 40. Thereafter, a simple reference to the transform information object may be utilized to disclose all those transform application capabilities which have been identified within data processing network 8.

Figure 3:
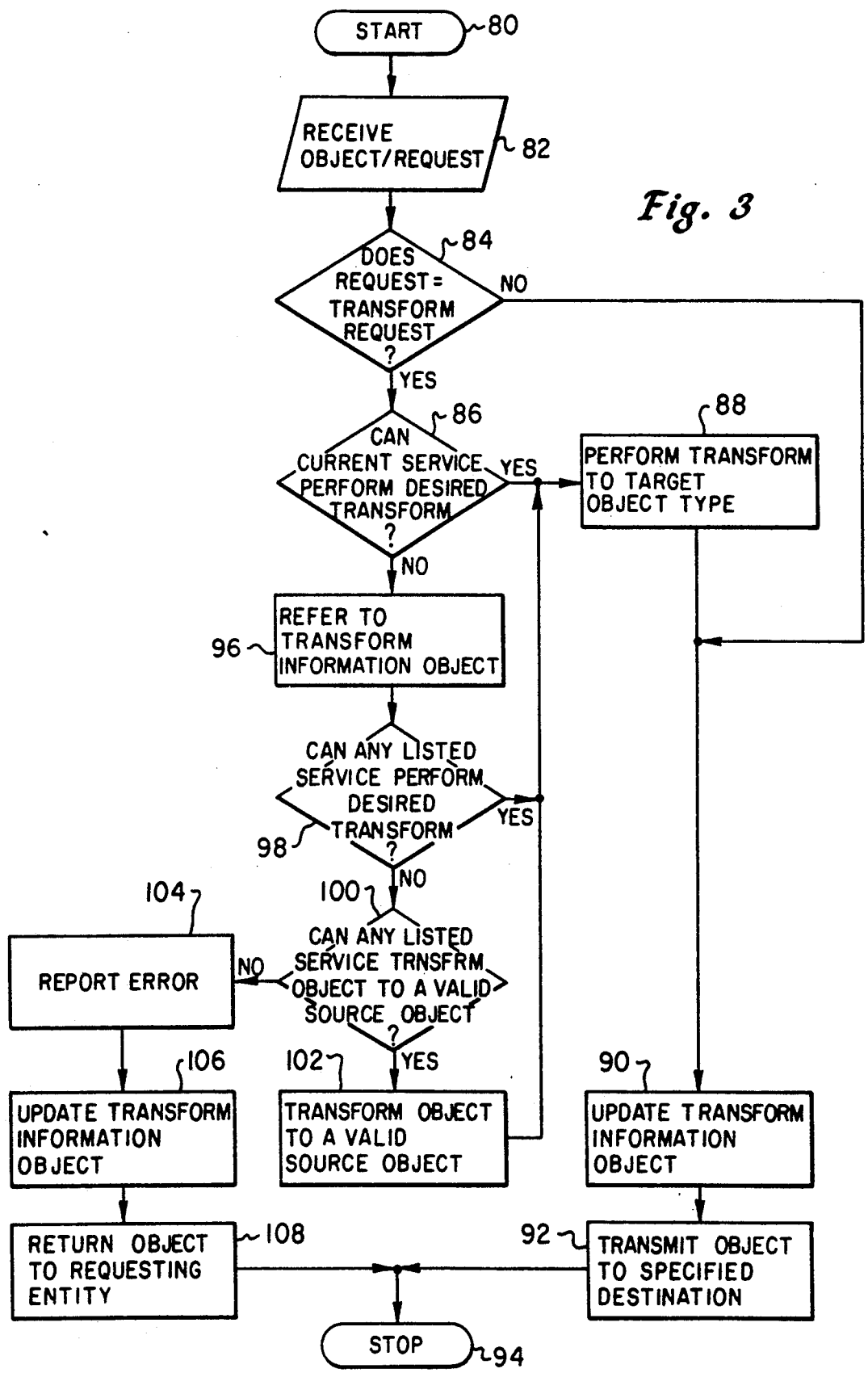
FIG. 3 is a high level logic flow chart which depicts the transformation of an object in accordance with the method and system of the present invention.

With reference now to FIG. 3, there is depicted a high level flow chart which illustrates the method and system of the present invention. As is illustrated, the process begins at block 80 and thereafter passes to block 82 which illustrates the receiving of a data object and/or a request at some portion of data processing network 8 (see FIG. 1). Next, block 84 illustrates a determination of whether or not the request which has been received is a request for a transformation of a data object.

If the request received is not a transform request, as determined in block 84, then the process passes to block 90 which illustrates the updating of the transform information object to include those transform capabilities which may exist within the library service or user presently maintaining the data object. Thereafter, block 92 depicts the transmitting of the object to its specified destination. The illustrated process then terminates, as illustrated in block 94.

Referring again to block 84, in the event the received request includes a transform request, then the process passes to block 86. Block 86 illustrates a determination of whether or not the current service or user can perform the desired transform. This is accomplished by a reference to the current service's tables of available transform applications, which will preferably include not only locally available transform applications but also references to known transform applications located in other ares of data processing system 8 (see FIG. 1). If the current service or user is capable of such transformation, the process passes to block 88 and the transformation of the received data object to the target object type is accomplished.

After transforming the received data object to the target data object type, as illustrated in block 88, the process passes to block 90 which depicts the updating of the transform information object with all relevant information concerning that transformation. Thereafter, block 92 illustrates the transmitting of the object to its specified destination and the process again terminates, as illustrated in block 94.

Referring again to block 86, in the event the current user or service cannot perform the desired transformation of the received data object, the process passes to block 96. Block 96 depicts a reference to the transform information object which is stored within data processing network s in association with each data object.

Next, block 98 illustrates a determination of whether or not any listed service within the transform information object can perform the desired transformation. If so, the process returns to block 88 and the desired transformation is accomplished. As above, the process then passes to block 90, wherein the transform information object associated with that document is updated. Next, the object is transmitted to its specified destination, as depicted in block 92 and the procedure terminates, as illustrated in block 94.

Referring again to block 98, in the event no listed service within the transform information object is capable of performing the desired transform, the process passes to block 100. Block 100 illustrates a determination of whether or not any listed service within the transform information object can perform a transformation of the object to a valid source object, from which the object may be transformed into the desired target object type.

In the event a listed transformation service within the transform information object is capable of transforming the received object to a valid source object type, the process passes to block 102. Block 102 illustrates the transformation of the object to a valid source object and thereafter the process returns to block 88 which illustrates the transformation of the object from the valid source object type to the target object type desired. As above, the transform information object is then updated, as illustrated in block 90, and the object is transmitted to its specified destination, as depicted in block 92. Thereafter, the process again terminates, as illustrated in block 94.

Referring again to block 100, in the event no listed transformation service within the transform information object can transform the received object to a valid source object, and no listed service is capable of directly performing the desired transformation the process passes to block 104. Block 104 illustrates the reporting of an error. An error message indicating that the requested transformation cannot be accomplished is one manner in which this error report may be generated.

Next, block 106 illustrates the updating of the transform information object With the parameters associated with this unfulfilled request and thereafter, block 108 illustrates the returning of the received data object to the requesting entity. Finally, the process terminates, as illustrated in block 94.

Upon reference to the foregoing those skilled in the art will appreciate that by utilizing the method and system of the present invention a transform information object may be created in association with each document which undergoes a transformation within a data processing network. Thereafter, an identification of each document type and a transform application which may perform such a transformation is listed within the transform information object. As the data object traverses the data processing network each library service or user having a transform application capability may also list that capability within the transform information object so that a subsequent request for a transformation of a data object may be efficiently accomplished by a reference to the transform information object and a rapid determination of whether or not such a transformation is possible by means of those transformation applications listed therein.

While the invention has been particularly shown and described with reference to a preferred embodiment, it will be understood by those skilled in the art that various changes in form and detail may be made therein without departing from the spirit and scope of the invention.

I claim:

1. A computer implemented method in a data processing system for efficiently managing the transformation of a document from a first document type to one of a plurality of second document types by a plurality of applications which may not be able to transform all entities in said document, said method comprising the computer implemented steps of:

creating and storing within said data processing system a transform information object in association with said document;

storing within said transform information object within said data processing system: a plurality of document type indications, each of said document type indications relating to a different one of said plurality of second document types, wherein each of said document type indications has been created as a result of a transformation of said document; a plurality of application identifications, each of said application identifications indicating a different one of said plurality of applications which performed an associated transformation, said application identifications comprising an address location for an associated application; and, a plurality of entity indications, each of said entity indications indicating said entities within said document which were not transformable by said application such that a reversal of any transformation listed within said transform information object may be accurately accomplished within said data processing system by a reference to said transform information object; and selectively reversing a transformation of said document from one of said second document types to said first document type by referencing said transform information object.

2. The method according to claim 1, wherein said step of storing a plurality of application identifications within said transform information object further comprises the step of storing a description of the capability of an application for transformation of documents with an associated application identification within said transform information object.

3. The method according to claim 1, further including the step of storing a cost associated with each transformation of said document within said transform information object.

4. A data processing system for efficiently managing the transformation of a document from a first document type to one of a plurality of second document types by a plurality of applications which may not be able to transform all entities in said document, said data processing system comprising:

means for creating and storing within said data processing system a transform information object in association with said document;

means for storing within said transform information object within said data processing system; a plurality of document type indications, each of said document type indications relating to a different one of said plurality of second document types, wherein each of said document type indications has been created as a result of a transformation of said document; a plurality of application identifications, each of said application identifications indicating a different one of said plurality of applications which performed an associated transformation, said application identifications comprising an address location for an associated application; and, a plurality of entity indications, each of said entity indications indicating said entities within said document which were not transformable by said application such that a reversal of any transformation listed within said transform information object may be accurately accomplished within said data processing system by a reference to said transform information object; and means for selectively reversing a transformation of said document from one of said second document types to said first document type by referencing said transform information object.

5. The data processing system according to claim 4, further including means for storing a description of a capability of an application for transformation of documents within said transform information object.

6. The data processing system according to claim 4, further including means for storing a cost associated with each transformation of said document within said transformation information object.

* * * * *